3,288,806
α-(AMINOETHOXYPHENYL)-α-ALKYLSTILBENES

Horace A. De Wald, Ann Arbor, Mich., assignor to Parke, Davis & Company, Detroit, Mich., a corporation of Michigan
No Drawing. Filed Mar. 23, 1964, Ser. No. 354,134
5 Claims. (Cl. 260—326.5)

The present invention relates to new stilbene compounds. More particularly, it relates to certain new α-(aminoethoxyphenyl) - α' - alkylstilbene compounds, to acid-addition and quaternary ammonium salts thereof, and to methods for their production.

In the forms of their free bases, the compounds of the invention can be represented by the structural formula

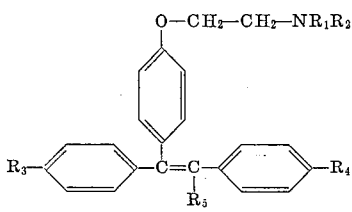

In this formula, each of $R_1$ and $R_2$ represents lower alkyl, or $R_1$ and $R_2$ are combined and together represent oxydiethylene, or lower alkylene of 4, 5, 6, 7, or 8 carbon atoms, 4 or 5 of which carbon atoms are in annular position with the nitrogen atom to which they are attached; $R_3$ represents lower alkyl, lower alkoxy, lower alkylthio or halogen; $R_4$ represents hydrogen, lower alkyl, lower alkoxy, or halogen; and $R_5$ represents alkyl of 1, 2, or 3 carbon atoms. When $R_1$ and $R_2$ are combined and represent oxydiethylene, the group —$NR_1R_2$ represents the morpholino radical. When $R_1$ and $R_2$ are combined and represent lower alkylene, the group —$NR_1R_2$ represents a pyrrolidino, lower alkylpyrrolidino, piperidino, or lower alkylpiperidino radical. In the compounds of the invention, the preferred lower alkyl groups are methyl and ethyl; the preferred lower alkoxy groups are methoxy and ethoxy; and the preferred halogen is chlorine. Especially preferred compounds of the invention are those in which the group $R_3$ is methoxy.

According to the invention, the foregoing compounds are produced by reacting a triarylalkanol compound having in free base form the formula

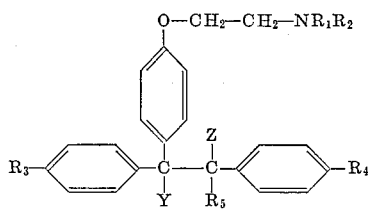

with a dehydrating agent; where $R_1$, $R_2$, $R_3$, $R_4$, and $R_5$ are as defined before; one of Y and Z is hydrogen; and the other of Y and Z is hydroxy. Some examples of suitable dehydrating agents are mineral acids such as 85% phosphoric acid, concentrated sulfuric acid, and hydrogen chloride; organic acids such as p-toluenesulfonic acid and acetic acid; acid chlorides such as thionyl chloride; and heat in the absence of a chemical dehydrating agent. The dehydrating agents can be used singly or in various combinations, such as hydrogen chloride in acetic acid. Preferred dehydrating agents are 85% phosphoric acid, and acetic acid. The optimum time and temperature of the dehydration reaction, the ratio of reactants, and the suitable solvents depend to a considerable extent on the particular dehydrating agent being used. For example, when the dehydrating agent is 85% phosphoric acid, p-toluenesulfonic acid, acetic acid, or a similar acid, the reaction is usually carried out in the absence of an added solvent although if desired benzene, toluene, xylene, or some other unreactive solvent may be used. When the dehydrating agent is hydrogen chloride, it is usually employed in a solvent such as methanol, ethanol, or another lower alkanol, or in a medium such as acetic acid, which functions both as a solvent and as a dehydrating agent. When the dehydrating agent is thionyl chloride, it is preferable to carry out the reaction in the presence of pyridine or other tertiary amines. When the dehydrating agent is heat in the absence of a chemical dehydrating agent, so that a thermal dehydration is effected, it is customary to carry out the reaction in a nitrogen atmosphere without adding solvent. In order to obtain the best yields, it is customary to employ an excess of the dehydrating agent when a chemical dehydrating agent is used. The time and temperature of the reaction depend somewhat on the nature of the groups substituted on the aromatic rings as well as on the particular dehydrating agent but in almost all cases the reaction is carried out at a temperature from about 0–250° C. for from 1 minute to 48 hours, the higher temperatures being used for thermal dehydrations. With the preferred chemical dehydating agents, it is customary to carry out the reaction at a temperature of about 50–110° C. for from 1 to 10 hours. The product can be isolated in either salt or free base form. For example, in the case of dehydration with an acidic dehydrating agent, the product can be isolated directly as an acid-addition salt; following basification as the free base, or following basification and subsequent salt formation as an acid-addition or quaternary ammonium salt.

The triarylalkanol compounds employed as starting materials can be prepared by any of a variety of methods. For example, triarylalkanol compounds wherein Y is hydroxy and Z is hydrogen are obtained by the reaction of a benzophenone of the formula

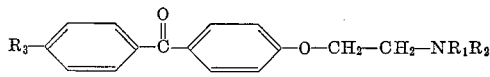

with a benzylmagnesium halide compound of the formula

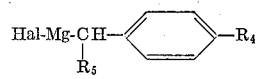

in an anhydrous ethereal solvent, followed by hydrolysis of the reaction mixture with ammonium chloride solution; where $R_1$, $R_2$, $R_3$, $R_4$, and $R_5$ are as defined before and Hal is halogen, preferably chlorine or bromine. By pH adjustment, the product is isolated either as the free base or an acid-addition salt.

The benzophenone compounds of the formula shown above can be prepared by any of a variety of methods. For example, they can be prepared by reacting a 4-hydroxybenzophenone compound of the formula

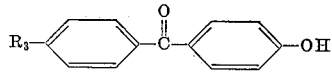

with an aminoalkyl halide of the formula $$Hal—CH_2—CH_2—NR_1R_2$$

in the presence of sodium hydride; where $R_1$, $R_2$, and $R_3$ are as defined before and Hal represents halogen, preferably chlorine. The benzophenone compounds can also be obtained by reacting a benzonitrile derivative of the formula

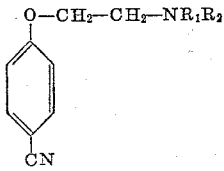

with an arylmagnesium halide of the formula

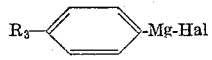

in an ethereal solvent, followed by hydrolysis of the reaction mixture with ammonium chloride solution and further hydrolysis of the reaction product by heating it with mineral acid; where $R_1$, $R_2$, and $R_3$ are as defined before and Hal represents halogen. In all cases, the respective free bases are obtained following neutralization or basification.

The benzylmagnesium halide compounds of the formula shown above are obtained by reacting the corresponding benzyl halides with magnesium in an anhydrous ethereal solvent. In most cases the benzyl halides are known or can be prepared by well known methods such as reducing a phenone with sodium borohydride and reacting the resulting alcohol with thionyl chloride.

An illustration of the preparation of triarylalkanol starting materials wherein Y is hydrogen and Z is hydroxy is as follows. A benzaldehyde compound of the formula

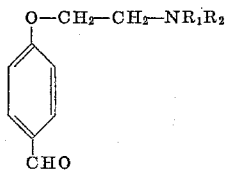

where $R_1$ and $R_2$ are as defined before is reacted with sodium bisulfite, the product reacted with potassium cyanide, and the product then reacted with thionyl chloride and basified to give a phenylacetonitrile compound of the formula

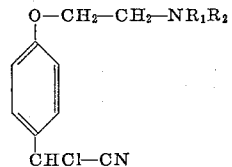

This compound is reacted with a substituted phenylmagnesium halide, the product hydrolyzed by heating under reflux with hydrochcloric acid, the resulting ketone reacted with an alkylmagnesium halide of the formula

and the product hydrolyzed with aqueous ammonium chloride; where $R_5$ and Hal are as defined before. Various alternative methods of preparing starting materials are illustrated in greater detail in the examples to follow.

Also in accordance with the invention, the foregoing α-(aminoethoxyphenyl)-α'-alkylstilbene compounds of the invention are produced by reacting an α-(haloethoxyphenyl)-α'-alkylstilbene compound of the formula

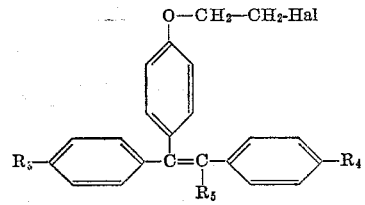

with an amino compound of the formula

where $R_1$, $R_2$, $R_3$, $R_4$, and $R_5$ are as defined before; Hal is halogen, preferably chlorine or bromine and M is hydrogen or a salt-forming agent. When M is a salt-forming agent it typically represents an alkali metal such as sodium, potassium, or lithium, an alkaline earth metal, or an ammonium or substituted ammonium group. At least the calculated amount and preferably a considerable excess of the amino compound is used in order to obtain the optimum yields. Some suitable solvents for the reaction are benzene, toluene, xylene, halogenated hydrocarbons, ethers, and other unreactive solvents. The time and temperature of the reaction depend somewhat on the specific reactants, but in general the reaction is carried out at a temperature of about 25–150° C. for from 1–48 hours, the preferred conditions being 50–120° C. or the reflux temperature of the solvent for 10–24 hours. By pH adjustment, the product is isolated either as the free base or an acid-addition salt.

The α-(haloethoxyphenyl)-α'-alkylstilbene compounds employed as starting materials can be prepared by any of a variety of methods. For example, a benzophenone compound of the formula

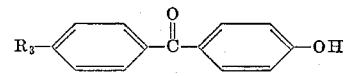

where $R_3$ is as defined before, is converted by reaction with 1-bromo-2-chloroethane in the presence of base to the β-chloroethoxy derivative of the formula

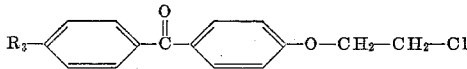

The latter compound is reacted with a benzylmagnesium halide compound of the formula

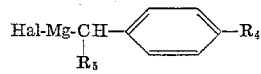

in an anhydrous ethereal solvent, followed by hydrolysis of the reaction mixture with ammonium chloride solution; where $R_4$ and $R_5$ are as defined before and Hal is halogen, preferably chlorine or bromine. The resulting alcohol is then dehydrated with a mineral acid or strong organic acid to give the α-(haloethoxyphenyl)-α'-alkylstilbene compound used as starting material.

The free bases of the invention form acid-addition salts with a variety of inorganic and organic acids. Pharmaceutically-acceptable acid-addition salts are formed with acids such as hydrochloric, hydrobromic, hydriodic, sulfuric, acetic, benzoic, citric, maleic, malic, gluconic, ascorbic, pamoic and related acids. The acid-addition salts can be formed by the reaction of the free base with the selected acid, by metathesis, by ion exchange, or by other salt forming means. The free bases of the invention also form quaternary ammonium salts. Pharmaceutically-acceptable quaternary ammonium salts are formed with salt forming agents such as methyl iodide, ethyl chloride, ethyl bromide, ethyl iodide, benzyl chloride, and methyl p-toluenesulfonate. The free bases and salts are generally equivalent for the purposes of the invention except that one or the other may be preferred for particular solubility properties. Both the free bases and salts of the invention can exist as cis-trans isomers.

The compounds of the invention are useful pharmacological agents and in particular exhibit anti-estrogenic, hypocholesteremic and anti-fertility activity. The anti-estrogenic effect is measured by administering the test compound and a standard estrogen such as estradiol to ovariectomized test animals and at the end of the test period comparing the uterine weight with the uterine weight of ovariectomized animals receiving a standard estrogen without an anti-estrogen. In this assay high anti-estrogenic activity is associated with low uterine weight. As hypocholesteremic agents, they cause a decrease in the level of blood cholesterol. Preferred antifertility and hypocholesteremic compounds of the invention are the 4-methoxystilbenes, that is the compounds wherein the group $R_3$ represents methoxy. The compounds of the invention are active upon oral administration but can also be given by the parenteral route if desired.

The invention is illustrated by the following examples.

Example 1

A mixture of 14 g. of 1-[p-(2-pyrrolidinoethoxy)phenyl]-1-(p-methoxyphenyl)-2-phenyl-1-propanol and 40 ml. of 85% phosphoric acid is heated at 90–100° C. for two hours. The resulting mixture is cooled and poured into 500 ml. of water and the solution obtained is made distinctly basic with sodium hydroxide and extracted with chloroform. The chloroform extract is washed with saturated sodium chloride solution, dried over magnesium sulfate and evaporated under reduced pressure to give a residue of α-[p-(2-pyrrolidinoethoxy)phenyl]-α'-methyl-4-methoxystilbene. The monocitrate salt is obtained by dissolving 4.5 g. of the free base in 25 ml. of warm methyl ethyl ketone, adding a solution of 2 g. of citric acid in 20 ml. of methyl ethyl ketone, cooling the mixture and collecting the salt which precipitates; M.P. 68–70° C. (monohydrate) following crystallization from methyl ethyl ketone. The maleate salt is obtained by treating a solution of 4.5 g. of the free base in 15 ml. of methanol with 1.2 g. of maleic acid, adding ether, and collecting the product. The methiodide is obtained by adding 7.5 ml. of methyl iodide to a cooled solution of 5 g. of the free base in 50 ml. of acetonitrile, allowing the mixture to remain at room temperature for 24 hours, pouring it into 500 ml. of ether, and collecting the product.

The starting material is obtained as follows. A solution of 17 g. of 4-(2-pyrrolidinoethoxy)-4'-methoxybenzophenone in 70 ml. of tetrahydrofuran is added slowly with stirring to a solution of α-methylbenzylmagnesium chloride prepared from 3 g. of magnesium and 14 g. of α-chloroethylbenzene in 100 ml. of ether. The mixture is heated under reflux with stirring for three hours and then hydrolyzed with 120 ml. of saturated ammonium chloride solution. The ether phase is separated, washed with saturated sodium chloride solution, and extracted with 150 ml. of 1 N hydrochloric acid. The aqueous acidic extract is separated, made distinctly basic with sodium hydroxide, and extracted with chloroform. The chloroform extract is dried over magnesium sulfate and evaporated to give 1-[p-(2-pyrrolidinoethoxy)phenyl]-1-(p-methoxyphenyl) - 2 - phenyl-1-propanol; the monocitrate, prepared by reacting the free base with citric acid in methyl ethyl ketone, has M.P. 63–65° C. The 4-(2-pyrrolidinoethoxy)-4'-methoxybenzophenone, M.P. 83–85° C., is prepared by reacting 44 g. of 4 hydroxy-4'-methoxybenzophenone and 10 g. of 52% sodium hydride in dimethylformamide solution, adding 51 g. of N-(β-chloroethyl)pyrrolidine in ether solution, heating the reaction mixture under partial reflux until most of the ether is removed and the temperature of the distillation vessel is 90° C., and continuing to heat the mixture at 90° C. for 3 hours.

Example 2

By the general procedure of Example 1, 10 g. of 1-[p-(2-piperidinoethoxy)phenyl] - 1 - (p-methoxyphenyl)-2-phenyl-1-propanol is reacted with 25 ml. of 85% phosphoric acid and the product basified to give α-[p-(2-piperidinoethoxy)phenyl]-α'-methyl - 4 - methoxystilbene. The monocitrate is obtained by reacting 4.5 g. of the free base in 15 ml. of methyl ethyl ketone with 2 g. of citric acid in 15 ml. of methyl ethyl ketone; M.P. 63–65° C. (monohydrate).

The starting material, 1 - [p - (2 - piperidinoethoxy)phenyl] - 1 - (p-methoxyphenyl) - 2 - phenyl-1-propanol, is prepared by the general procedure given in Example 1, from 4-(2-piperidinoethoxy) - 4' - methoxylbenzophenone and α-methylbenzylmagnesium chloride. The 4-(2-piperidinoethoxy) - 4' - methoxybenzophenone, M.P. 97–99° C., is prepared by reacting 4-hydroxy-4'-methoxybenzophenone, sodium hydride, and N-(β-chloroethyl)piperidine.

Example 3

By the general procedure of Example 1, 16 g. of 1-[p-(2-diethylaminoethoxy)phenyl] - 1 - (p-methoxyphenyl)-2-phenyl-1-propanol is reacted with 40 ml. of 85% phosphoric acid and the product basified to give α-[p-(2-diethylaminoethoxy)phenyl] - α' - methyl - 4 - methoxystilbene. The monocitrate is obtained by reacting 9 g. of the free base in 30 ml. of methyl ethyl ketone with 4 g. of citric acid in 30 ml. of methyl ethyl ketone; M.P. 77–79° C.

The starting material, 1-[p - (2 - diethylaminoethoxy)phenyl]-1-(p-methoxyphenyl) - 2 - phenyl-1-propanol, is prepared by the general procedure given in Example 1, from 4-(2-diethylaminoethoxy) - 4' - methoxybenzophenone and α-methylbenzylmagnesium chloride; the monocitrate, prepared by the reaction of the free base with citric acid in methyl ethyl ketone, has M.P. 84–86° C.

Example 4

A solution of 10 g. of 1-[p - (2 - pyrrolidinoethoxy)phenyl] - 1 - (p-tolyl)-2-phenyl - 1 - propanol in 50 ml. of absolute ethanol is saturated with dry hydrogen chloride and the resulting mixture is distilled to dryness in vacuo. The residue is dissolved in water and the solution is made basic with sodium hydroxide and extracted with ether. The ether extract is washed, dried, and evaporated to give α-[p-(2 - pyrrolidinoethoxy)phenyl] - α'-methyl-4-methylstilbene. The monocitrate is prepared by reacting 4.5 g. of the free base in 15 ml. of methyl ethyl ketone with 2 g. of citric acid in 15 ml. of methyl ethyl ketone; M.P. 70–73° C.

The starting material, 1-[p-(2-pyrrolidinoethoxy)phenyl]-1-(p-tolyl)-2-phenyl-1-propanol, is prepared by the general procedure given in Example 1, from 4-(2-pyrrolidinoethoxy)-4'-methylbenzophenone and α-methylbenzylmagnesium chloride; the monocitrate has M.P. 63° C. The 4 - (2 - pyrrolidinoethoxy) - 4'-methylbenzophenone, M.P. 71–73° C., is prepared by reacting 4-hydroxy-4'-methylbenzophenone, sodium hydride, and N-(β-chloroethyl)pyrrolidine.

Example 5

By the general procedure of Example 4, 20 g. of 1-[p-(2 - diethylaminoethoxy)phenyl] - 1-(p-tolyl)-2-(p-methoxyphenyl)-1-propanol in 100 ml. of absolute ethanol is reacted with dry hydrogen chloride and the product basified to give α-[p-(2-diethylaminoethoxy)phenyl]-α'-methyl-4-methyl-4'-methoxystilbene. The acetate salt is obtained by dissolving 3 g. of the free base in 20 ml. of acetic acid and evaporating the resulting solution in vacuo. The residue of the acetate salt is redissolved in water, shell frozen, and lyophilized.

The starting material, 1-[p-(2-diethylaminoethoxy)phenyl]-1-(p-tolyl)-2-(p-methoxyphenyl)-1 - propanol, is prepared by the general procedure given in Example 1, from 4 - (2-diethylaminoethoxy)-4'-methylbenzophenone and α-methyl-p-methoxybenzylmagnesium chloride.

Example 6

By the general procedure of Example 1, 10 g. of 1-[p-(2 - pyrrolidinoethoxy)phenyl] - 1-(p-methoxyphenyl)-2-phenyl-3-methyl-1-butanol is reacted with 45 ml. of 85% phosphoric acid and the product basified to give α-[p-(2-pyrrolidinoethoxy)phenyl] - α' - isopropyl-4-methoxystilbene. The monocitrate is obtained by reacting 4.5 g. of the free base in 15 ml. of methyl ethyl ketone with 2 g. of citric acid in 15 ml. of methyl ethyl ketone; M.P. 65° C.

The starting material, 1-[p-(2-pyrrolidinoethoxy)phenyl]-1-(p-methoxyphenyl)-2-phenyl-3-methyl-1-butanol, is prepared by the general procedure given in Example 1, from 4 - (2-pyrrolidinoethoxy)-4'-methoxybenzophenone and α-isopropylbenzylmagnesium chloride.

*Example 7*

By the general procedure of Example 1, 8 g. of 1-[p-(2 - pyrrolidinoethoxy)phenyl] - 1-(p-methoxyphenyl)-2-phenyl-1-butanol is reacted with 20 ml. of 85% phosphoric acid and the product basified to give α-[p-(2-pyrrolidinoethoxy)phenyl]-α'-ethyl - 4 - methoxystilbene. The monocitrate is obtained by reacting the free base with citric acid in methyl ethyl ketone; M.P. 73–76° C.

The starting material, 1-[p-(2-pyrrolidinoethoxy)phenyl]-1-(p-methoxyphenyl)-2-phenyl-1-butanol, is prepared by the general procedure given in Example 1, from 4-(2-pyrrolidinoethoxy)-4'-methoxybenzophenone, and α-ethylbenzylmagnesium chloride; the monocitrate has M.P. 68–70° C.

*Example 8*

By the general procedure of Example 1, 1-[p-(2-pyrrolidinoethoxy)phenyl] - 1 - (p-chlorophenyl)-2-phenyl-1-butanol is reacted with 85% phosphoric acid and the product basified to give α-[p-(2-pyrrolidinoethoxy)phenyl]-α'-ethyl-4-chlorostilbene; the monocitrate, hydrate, has M.P. 88–93° C.

The starting material, 1-[p-(2-pyrrolidinoethoxy)phenyl]-1-(p-chlorophenyl)-2-phenyl-1-butanol, is prepared by the general procedure given in Example 1, from 4-(2-pyrrolidinoethoxy)-4'-chlorobenzophenone and α-ethylbenzylmagnesium chloride.

The 4-(2-pyrrolidinoethoxy)-4'-chlorobenzophenone is prepared as follows. A solution of 33 g. of p-(2-pyrrolidinoethoxy)benzonitrile in 75 ml. of ether is added to a solution of p-chlorophenylmagnesium bromide prepared from 38 g. of p-chlorobromobenzene and 4 g. of magnesium in 150 ml. of ether. The reaction mixture is heated under reflux for 6 hours, cooled, and hydrolyzed by stirring it with ammonium chloride solution. The ether phase is separated and extracted with 1 N hydrochloric acid. The acidic solution is heated at 90–95° C. for 2 hours, made basic with sodium hydroxide solution and extracted with ether. The ether extract is washed with water, dried, and evaporated and the residue of 4-(2-pyrrolidinoethoxy)-4'-chlorobenzophenone is crystallized from ethyl acetate-petroleum ether; M.P. 97–98° C.

*Example 9*

By the general procedure of Example 1, 10 g. of 1-[p-(2 - pyrrolidinoethoxy)phenyl] - 1 - (p-fluorophenyl)-2-phenyl-1-propanol is reacted with 25 ml. of 85% phosphoric acid and the product basified to give α-[p-(2-pyrrolidinoethoxy)phenyl]-α'-methyl-4 - fluorostilbene. The monocitrate is obtained by reacting the free base with citric acid in methyl ethyl ketone; hydrate, M.P. 91–92.5° C. A sulfate salt is obtained by dissolving 4 g. of the free base in 100 ml. of 0.1 N sulfuric acid followed by freezing and lyophilizing the solution.

The starting material, 1-[p-(2-pyrrolidinoethoxy)phenyl]-1-(p-fluorophenyl)-2-phenyl-1-propanol, is prepared by the general procedure given in Example 1, from 4-(2-pyrrolidinoethoxy)-4'-fluorobenzophenone and α-methylbenzylmagnesium chloride. The 4-(2-pyrrolidinoethoxy)-4'-fluorobenzophenone is prepared as follows. A solution of 25 g. of p-fluorobenzonitrile in 100 ml. of ether is added to a solution of p-(2-pyrrolidinoethoxy)phenylmagnesium bromide prepared from 66 g. of p-(2-pyrrolidinoethoxy)phenyl bromide and 6 g. of magnesium in 250 ml. of tetrahydrofuran. The mixture is heated under reflux for 2 hours and hydrolyzed with ammonium chloride solution. The organic phase is separated and extracted with 400 ml. of 1 N hydrochloric acid. The aqueous acidic extract is further acidified with 50 ml. of concentrated hydrochloric acid, heated at 90–100° C. for 30 minutes, made basic with sodium hydroxide and extracted with benzene. The benzene solution is separated, dried and evaporated to give a residue of 4-(2-pyrrolidinoethoxy)-4'-fluorobenzophenone; M.P. 65–68° C. following crystallization from ethyl acetate-petroleum ether.

*Example 10*

By the general procedure of Example 1, 3.5 g. of 1 - [p - (2 - pyrrolidinoethoxy)phenyl]-1-(p-methylthio phenyl)-2-phenyl-1-propanol is reacted with 15 ml. of 85% phosphoric acid and the product basified to give α - [p-(2-pyrrolidinoethoxy)phenyl]p-α'methyl-4-methyl thiostilbene. The monocitrate is obtained by reacting the free base with citric acid in methyl ethyl ketone; hydrate, M.P. 70° C.

The starting material, 1-[p-(2-pyrrolidinoethoxy)phenyl]-1-(p-methylthiophenyl)-2-phenyl-1-propanol, is prepared by the general procedure given in Example 1, from 4-(2-pyrrolidinoethoxy)-4'-methylthiobenzophenone and α-methylbenzylmagnesium chloride. The monocitrate has M.P. 70–73° C. The 4-(2-pyrrolidinoethoxy)-4'-methylthiobenzophenone is prepared as follows. A solution of 33 g. of p-methylthiobenzonitrile in 100 ml. of ether is added to a solution of p-(2-pyrrolidinoethoxy)phenylmagnesium bromide prepared from 66 g. of p-(2-pyrrolidinoethoxy)phenyl bromide and 6 g. of magnesium in 250 ml. of tetrahydrofuran. The mixture is heated under reflux for 2 hours and hydrolyzed with ammonium chloride solution. The organic phase is separated and extracted with 400 ml. of 1 N hydrochloric acid. The aqueous acidic extract is further acidified with 50 ml. of concentrated hydrochloric acid, heated at 90–100° C. for 30 minutes, made basic with sodium hydroxide and extracted with benzene. The benzene solution is separated, dried and evaporated to give a residue of 4-(2-pyrrolidinoethoxy)-4'-methylthiobenzophenone; M.P. 86–89° C. following crystallization from ethyl acetate-petroleum ether.

In the same manner the following additional compounds are obtained. From 1-[p-(2-morpholinoethoxy)-phenyl] - 1-(p-methoxyphenyl)-2-phenyl-1-propanol, the product is α-[p-(2-morpholinoethoxy)phenyl]-α'-methyl-4-methoxystilbene. From 1 - {p - [2-(2,6-dimethylpiperidino)ethoxy]phenyl} - 1 - (p-methoxyphenyl)-2-phenyl-1-propanol, the product is α-{p-[2-(2,6-dimethylpiperidino)ethoxy]phenyl} - α' - methyl - 4-methoxystilbene. From 1-[p - (2 - dimethylaminoethoxy)phenyl] - 1 - (p-methoxyphenyl)-2-phenyl-1-propanol, the product is α-[p-(2-dimethylaminoethoxy)phenyl]-α'-methyl-4-methoxystilbene. The starting materials are obtained by reacting 4-hydroxy-4'-methoxybenzophenone with N-(β-chloroethyl)-morpholine, with N-(β-chloroethyl)-2,6-dimethylpiperidine, and with β-dimethylaminoethyl chloride, followed in each case by reacting the resulting products with α-methylbenzylmagnesium chloride and hydrolyzing with ammonium chloride solution.

*Example 11*

By the general procedure of Example 1, 13 g. of 1-[p - (2-prrrolidinoethoxy)-phenyl]-1-(p-ethoxyphenyl)-2-phenyl-1-propanol is reacted with 40 ml. of 85% phosphoric acid and the product basified to give α-[p-(2-pyrrolidinoethoxy)phenyl] - α'-methyl-4-ethoxystilbene. The monocitrate is obtained by reacting the free base with citric acid in methyl ethyl ketone; hydrate M.P. 92–95° C.

The starting material, 1-[p-(2-pyrrolidinoethoxy) phenyl]-1-(p-ethoxyphenyl)-2-phenyl-1-propanol, is prepared by the general procedure given in Example 1, from 4 - (2 - pyrrolidinoethoxy)-4'-ethoxybenzophenone and α-methylbenzylmagnesium bromide; the monocitrate has M.P. 69–72° C. The 4-(2-pyrrolidinoethoxy)-4'-ethoxybenzophenone is prepared as follows. A mixture of 27 g. of p-hydroxybenzoic acid, 25 g. of phenetole, and 400 g of polyphosphoric acid is heated at 85° C. for one hour with stirring and then poured into 1500 ml. of cold water. The mixture is extracted with ether and the ether solution is extracted with several portions of 1 N sodium hydroxide. The aqueous phase is separated, cooled, and acidified. The 4-hydroxy-4'-ethoxybenzophenone which precipitates is collected on a filter; M.P. 141–143° C. following crystallization from chloroform. This product is reacted with sodium hydride and N-(β-chloroethyl)-pyrrolidine to give 4-(2-pyrrolidinoethoxy)-4'-(ethoxy-benzophenone, M.P. 74–77° C.

Example 12

By the general procedure of Example 1, 14 g. of 1 - [p-(2-pyrrolidinoethoxy)phenyl]-1-(1-ethylphenyl)-2-phenyl-1-propanol is reacted with 20 ml. of 85% phosphoric acid and the product basified to give α-[p-(2-pyrrolidinoethoxy)phenyl] - α' - methyl - 4 - ethylstilbene. The monocitrate is obtained by reacting the free base with citric acid in methyl ethyl ketone; hydrate, M.P. 71–73° C. The hydrochloride is obtained by treating an ether solution of the free base with hydrogen chloride. A pamoate salt is prepared by reacting equimolar amounts of the hydrochloride and sodium pamoate in aqueous solution.

The starting material, 1-[p-(2-pyrrolidinoethoxy)-phenyl]-1-(p-ethylphenyl)-2-phenyl-1-propanol, is prepared by the general procedure given in Example 1, from 4 - (2 - pyrrolidinoethoxy-4'-ethylbenzophenone and α-methylbenzylmagnesium chloride; the monocitrate has M.P. 70–72° C. The 4-(2-pyrrolidinoethoxy)-4'-ethyl-benzophenone is prepared as follows. A solution of 42 g. of p-(2-pyrrolidinoethoxy)benzonitrile in 75 ml. of ether is added to a solution of p-ethylphenylmagnesium bromide prepared from 55 g. of p-ethylbromobenzene and 7.5 g. of magnesium in 150 ml. of ether. The mixture is heated under reflux for 2 hours and hydrolyzed with ammonium chloride solution. The organic phase is separated and extracted with 400 ml. of 1 N hydrochloric acid. The aqueous acidic extract is further acidified with 50 ml. of concentrated hydrochloric acid, heated at 90–100° C. for 30 minutes, made basic with sodium hydroxide and extracted with chloroform. The chloroform solution is separated, dried, and evaporated to give a residue of 4-(2-pyrrolidinoethoxy)-4'-ethylbenzophenone; the monocitrate has M.P. 69–72° C.

Example 13

By the general procedure of Example 1, 10 g. of 1-[p - (2 - pyrrolidinoethoxy)phenyl] - 1 - (p - tolyl) - 2-phenyl-1-butanol is reacted with 25 ml. of 85% phosphoric acid and the product basified to give α-[p-(2-pyrrolidinoethoxy)phenyl] - α' - ethyl-4-methylstilbene. The monocitrate is obtained by reacting the free base with citric acid in methyl ethyl ketone; M.P. 66° C.

The starting material, 1-[p-(2-pyrrolidinoethoxy) phenyl]-1-(p-tolyl)-2-phenyl-1-butanol, is prepared by the general procedure given in Example 1, from 4-(2-pyrrolidinoethoxy-4'-methylbenzophenone and α-ethylbenzyl-magnesium chloride.

Example 14

A mixture of 4.5 g. of 1-[p-(2-diethylaminoethoxy) phenyl] - 1 - (p - chlorophenyl) - 2 - (p-tolyl) - 3 - methyl-1-butanol and 2.3 g. of p-toluenesulfonic acid is heated at 120° C. for 3 hours and then cooled and dissolved in 20 ml. of absolute ethanol. The resulting solution is diluted with ether to precipitate the p-toluene-sulfonate salt of α-[p-(2-diethylaminoethoxy)phenyl]-α'-isoproply-4-chloro-4'-methylstilbene. The free base is obtained by dissolving the p-toluenesulfonate salt in water, making the solution basic with sodium hydroxide and extracting with chloroform.

The starting material, 1-[p-(2-diethylaminoethoxy) phenyl] - 1 - (p - chlorophenyl) - 2 - (p-tolyl)-3-methyl-1-butanol, is prepared by the general procedure given in Example 1, from 4-(2-diethylaminoethoxy)-4'-chloro-benzophenone and p-methyl-α-isopropylbenzylmagnesium chloride. The latter compound is obtained by reducing p-methylisobutyrophenone with sodium borohydride, reacting the resulting alcohol with thionyl chloride, and reacting the p-methyl-α-isopropylbenzyl chloride so obtained with magnesium in ether.

Example 15

A mixture of 5 g. of 1-[p-(2-diethylaminoethoxy)phenyl] - 1 - (p - methoxyphenyl) - 2 - (p - methoxyphenyl)-2-propanol and 20 ml. of 85% phosphoric acid is heated at 90–100° C. for 2 hours, cooled, and poured into 250 ml. of water. The resulting solution is made distinctly basic with sodium hydroxide and extracted with chloroform. The chloroform extract is washed with saturated sodium chloride solution, dried over magnesium sulfate and evaporated under reduced pressure to give a residue of α - [p - (2-diethylaminoethoxy)phenyl] - α' - methyl-4,4'-dimethoxystilbene as a viscous pale yellow oil.

The starting material is obtained as follows. Wtih stirring, 65 g. of p-(2-diethylaminoethoxy)benzaldehyde is added to a solution of 50 g. of sodium bisulfite in 500 ml. of water. The mixture is cooled to 10° C. and a solution of 23 g. of potassium cynanide in 50 ml. of water is added over a period of one hour. The mixture is extracted with ether and the ether solution is separated, washed with water, dried, and evaporated to give a residue of α-hydroxy-p-(2-diethylaminoethoxy)phenylaceto-nitrile. This product is dissolved in 400 ml. of chloroform and warmed with an excess of thionyl chloride. The chloroform and unreacted thionyl chloride are removed by distillation under reduced pressure to leave a residue of α - chloro-p-(2-diethylaminoethoxy)phenylacetonitrile hydrochloride. The free base is obtained by dissolving the hydrochloride in water, adding cold sodium hydroxide solution, extracting with ether, and evaporating the ether solution. Twenty-six g. of α-chloro-p-(2-diethyl-aminoethoxy)phenylacetonitrile is dissolved in ether and an ether solution of p-methoxyphenylmagnesium bromide (prepared from 75 g. of p-methoxyphenyl bromide) is slowly added. The reaction mixture is heated under reflux for one hour and hydrolyzed with hydrochloric acid. After hydrolysis is complete, the aqueous solution is made basic and extracted with ether. The ether extract is washed, dried, and evaporated to give a residue of α-[p-(2-diethylaminoethoxy)phenyl] - α - (p-methoxyphenyl)-4-methoxyacetophenone. This product is dissolved in ether and an excess of methylmagnesium iodide in ether is slowly added, with efficient stirring. The mixture is heated under reflux for one hour and hydrolyzed with aqueous ammonium chloride solution. The mixture is made basic and extracted wtih ether and the ether solution is separated, dried, and evaporated to give a residue of 1-[p-(2-diethylaminoethoxy)phenyl] - 1 - (p-methoxyphenyl)-2-(p-methoxyphenyl)-2-propanol.

Example 16

By the general procedure of Example 1, 1-[p-(2-pyr-rolidinoethoxy)phenyl] - 1 - (p - chlorophenyl) - 2 - (p-chlorophenyl)-1-propanol is reacted with 85% phosphoric acid and the product basified to give α-[p-2-pyrrolidino-ethoxy)phenyl]-α'-methyl-4,4'-dichlorostilbene.

The starting material, 1-[p-pyrrolidinoethoxy)phenyl] - 1 - (p - chlorophenyl) - 2 - (p - chlorophenyl)-1-propanol, is prepared by the general procedure given in Example 1, from 4 - (2 - pyrrolidinoethoxy) - 4' - chloro-benzophenone and α - methyl-p-chlorobenzylmagnesium chloride.

Example 17

A solution of the lithium salt of pyrrolidine is prepared by treating 3.5 g. of pyrrolidine in 75 ml. of ether with 3.2 g. of butyllithium in 75 ml. of ether. A solution of 5.6 g. of 1-[p-(2-chloroethoxy)phenyl]-1-(p-methoxy-phenyl)-2-phenyl-1-propylene in 100 ml. of benzene is added and the reaction mixture is heated under reflux for 24 hours and then cooled and hydrolyzed with saturated ammonium chloride solution. The organic phase is separated, washed, dried and evaporated under reduced pressure to give a residue of α-[p-(2-pyrrolidinoethoxy)phenyl] - α' - methyl-4-methoxy stilbene. The monocitrate salt is obtained by dissolving 4.5 g. of the free base in 25 ml. of warm methyl ethyl ketone, adding a solution of 2 g. of citric acid in 20 ml. of methyl ethyl ketone, cooling the mixture and collecting the salt which precipitates; M.P. 68–70° C. (monohydrate) following crystallization from methyl ethyl ketone.

The starting material is obtained as follows. A mixture of 46 g. of 4-hydroxy-4'-methoxybenzophenone and 12 g. of sodium methoxide in 200 ml. of dimethylformamide is stirred for 30 minutes. To this is added 56 g. of 1-bromo-2-chloroethane and the mixture is heated with stirring at 90° C. for ten hours, cooled, diluted with 700 ml. of ether, and washed with 5% sodium hydroxide solution and with two portions of saturated sodium chloride solution. The organic phase is separated and evaporated under reduced pressure to give a residue of 4-(β-chloroethoxy) - 4' - methoxybenzophenone; M.P. 102–104° C. following crystallization from ethanol. A solution of 30 g. of 4-(β-chloroethoxy)-4'-methoxybenzophenone in 150 ml. of tetrahydrofuran is added slowly with stirring to a solution of α-methylbenzylmagnesium chloride prepared from 15 g. of α-chloroethylbenzene and a slight excess of magnesium in 200 ml. of ether. The mixture is heated under reflux with stirring for 3 hours and hydrolyzed wits saturated ammonium chloride solution. The ether phase is separated, washed wtih saturated sodium chloride solution, dried, and evaporated to give a residue of 1-[p-(2-chloroethoxy)phenyl]-1-(p-methoxyphenyl)-2-phenyl-1-propanol, suitable for use without further purification. This product is dehydrated to give 1 - [p - (2-chloroethoxy)phenyl]-1-(p-methoxyphenyl)-2-phenyl-1-propylene by dissolving it in absolute ethanol, saturating the solution with hydrogen chloride, and heating it under reflux for 15 minutes. The product is obtained by evaporating the solution to dryness under reduced pressure.

I claim:
1. A member of the class consisting of compounds of the formula

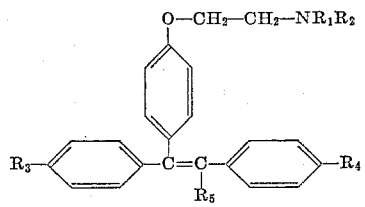

and pharmaceutically-acceptable acid-addition and quaternary ammonium salts thereof, where $R_1$ and $R_2$ are members of the class consisting of lower alkyl and further members wherein $R_1$ and $R_2$ are combined and are selected from among
 (a) oxydiethylene and
 (b) lower alkylene of more than 3 and fewer than 9 carbon atoms, more than 3 and fewer than 6 of which are in annular position with the nitrogen atom;

$R_3$ is a member of the class consisting of lower alkyl, lower alkoxy, lower alkylthio and halogen; $R_4$ is a member of the class consisting of hydrogen, lower alkyl, lower alkoxy, and halogen; and $R_5$ is alkyl of 1 to 3 carbon atoms inclusive.

2. α - [p - (2 - pyrrolidinoethoxy)phenyl] - α' - methyl-4-methoxystilbene.

3. Pharmaceutically-acceptable acid-addition salts of α - [p - (2 - pyrrolidinoethoxy)phenyl]-α'-methyl-4-methoxystilbene.

4. α - [p - (2 - diethylaminoethoxy)phenyl]-α'-methyl-4-methoxystilbene.

5. α - [p - (2 - pyrrolidinoethoxy)phenyl]-α'-ethyl-4-methoxystilbene.

References Cited by the Examiner
UNITED STATES PATENTS
2,914,561  11/1959  Allen et al. _____ 260—570

OTHER REFERENCES
Fieser et al., Organic Chemistry, pages 56–57, 226–227 (1956), QD 251 F5, 1956 C. 6.
Wagner et al., Synthetic Organic Chemistry, pages 667–668 (1953), QD 262 W24 C. 2.

ALEX MAZEL, Primary Examiner.

HENRY R. JILES, Examiner.

J. A. NARCAVAGE, Assistant Examiner.